US007514052B2

(12) United States Patent
Lissianski et al.

(10) Patent No.: US 7,514,052 B2
(45) Date of Patent: Apr. 7, 2009

(54) METHOD FOR REMOVAL OF MERCURY EMISSIONS FROM COAL COMBUSTION (75) Inventors: Vitali Victor Lissianski, San Juan Capistrano, CA (US); Peter Martin Maly, Lake Forest, CA (US); William Randall Seeker, San Clemente, CA (US); Vladimir M. Zamansky, Oceanside, CA (US)

(73) Assignee: General Electric Company, Schenectady, NY (US)

( * ) Notice: Subject to any disclaimer, the term of this patent is extended or adjusted under 35 U.S.C. 154(b) by 893 days.

(21) Appl. No.: 10/751,496

(22) Filed: Jan. 6, 2004

(65) Prior Publication Data
US 2005/0147549 A1 Jul. 7, 2005

(51) Int. Cl.
*B01D 47/00* (2006.01)
(52) U.S. Cl. .................................. 423/210; 423/240 S
(58) Field of Classification Search ................. 423/210, 423/99, 240 R, 240 S, 239, 239.1
See application file for complete search history.

(56) References Cited

U.S. PATENT DOCUMENTS

| 4,196,173 | A | 4/1980 | deJong et al. |
| 4,233,274 | A | 11/1980 | Allgulin |
| 4,273,747 | A | 6/1981 | Rasmussen |
| 4,814,152 | A | 3/1989 | Yan |
| 4,843,102 | A | 6/1989 | Horton |
| 5,141,724 | A | 8/1992 | Audeh et al. |
| 5,409,522 | A | 4/1995 | Durham et al. |
| 5,413,477 | A | 5/1995 | Moreland |
| 5,572,938 | A | 11/1996 | Leger |
| 5,695,726 | A | 12/1997 | Lerner |
| 5,787,823 | A | 8/1998 | Knowles |
| 6,027,551 | A | 2/2000 | Hwang et al. |
| 6,206,685 | B1 | 3/2001 | Zamansky et al. |
| 6,280,695 | B1 | 8/2001 | Lissianski et al. |
| 6,451,094 | B1 | 9/2002 | Chang et al. |
| 6,471,506 | B1 | 10/2002 | Zamansky et al. |
| 6,521,021 | B1 | 2/2003 | Pennline et al. |
| 6,558,454 | B1 | 5/2003 | Chang et al. |
| 6,595,147 | B2 | 7/2003 | Teller et al. |
| 6,604,474 | B2 | 8/2003 | Zamansky et al. |
| 6,719,828 | B1 | 4/2004 | Lovell et al. |
| 6,878,358 | B2 | 4/2005 | Vosteen et al. |
| 2001/0041157 | A1 | 11/2001 | Spokoyny |
| 2002/0029690 | A1 | 3/2002 | Ridgeway et al. |
| 2002/0095866 | A1 | 7/2002 | Hassett |
| 2002/0102189 | A1 | 8/2002 | Madden et al. |
| 2002/0166484 | A1 | 11/2002 | Zamansky et al. |
| 2002/0170431 | A1 | 11/2002 | Chang et al. |
| 2003/0005634 | A1 | 1/2003 | Calderon et al. |
| 2003/0009932 | A1 | 1/2003 | Kobayashi et al. |
| 2003/0079606 | A1 | 5/2003 | Katz |
| 2003/0091490 | A1 | 5/2003 | Nolan et al. |
| 2003/0091948 | A1 | 5/2003 | Bool, III et al. |
| 2003/0099912 | A1 | 5/2003 | Kobayashi et al. |
| 2003/0099913 | A1 | 5/2003 | Kobayashi et al. |
| 2003/0104328 | A1 | 6/2003 | Kobayashi et al. |
| 2003/0104937 | A1 | 6/2003 | Sinha |
| 2003/0108470 | A1 | 6/2003 | Spencer et al. |
| 2003/0108833 | A1 | 6/2003 | Kobayashi et al. |
| 2003/0110994 | A1 | 6/2003 | Lissianski et al. |
| 2003/0143128 | A1 | 7/2003 | Lanier et al. |
| 2003/0147793 | A1 | 8/2003 | Breen et al. |
| 2003/0154858 | A1 | 8/2003 | Kleut et al. |
| 2003/0185718 | A1 | 10/2003 | Sellakumar |
| 2004/0011057 | A1 | 1/2004 | Huber |

FOREIGN PATENT DOCUMENTS

| CA | 2 435 474 A1 | 1/2004 |
| DE | 102 33 173 A1 | 2/2004 |

OTHER PUBLICATIONS

"Kinetic Models For Predicting the Behavior Of Mercury In Coal-Fired Power Plants", C. Senior, et al., ACERC Annual Conference, Feb. 19-20, 2003, pp. 1-22.
"Evaluating The Effects of Low-NOx Retrofits on Carbon In Ash Levels[1]", K.A. Davis, et al. Presented at the Mega Symposium: EPRI-DOE-EPA Combined Utility Air Pollutant Control Symposium, Atlanta, GA, Aug. 1999, pp. 1-15.
"Behavior of Mercury In Air Pollution Control Devices on Coal-Fired Utility Boilers[1]" Constance L. Senior, Prepared For Power Production in the 21st Century: Impacts of Fuel Quality and Operations, Engineering Foundation Conference, Snowbird, UT, Oct. 28-Nov. 2, 2001, pp. 1-17.
"Loss On Ignition In Coal Combustion Simulations", Stefan P. Domino et al., pp. 1-49 (1999).
Reaction Engineering International brochure "Furnace Performance", Reaction Engineering International, printed from REI website on Aug. 22, 2003, pp. 1-2.
"Comparison of Photoacoustic Methods To Loss-On-Ignition and Foam Index Tests In Fly Ash Evaluations", Robert Novack, et al., pp. 1-2 (1997).
"Combustion Optimization Using MPV Systems", Mark Khesin, et al., Pittsburgh Coal Conference, Sep. 2000, pp. 1-4.
"Reburn Systems", GE Power Systems, Air Quality Systems & Services, pp. 1-3, GEA-13207 (2001).
"FlamemastEER™ Low $NO_x$ Burners", GEA-13132, p. 1, printed Dec. 2003.
"$NO_x$ Control for Gas Turbines", GE Power Systems, pp. 1-2, printed Dec. 17, 2003.

(Continued)

Primary Examiner—Edward M Johnson
(74) Attorney, Agent, or Firm—Nixon & Vanderhye P.C.

(57) ABSTRACT

A method to reduce emissions in flue gas due to combustion of coal in a combustion unit including the steps of: combusting coal in a primary combustion zone of the combustion unit; releasing elemental mercury from the combustion into the flue gas; injecting $NH_4Cl$, $NH_4Br$, or $NH_4I$ into the flue gas; oxidizing the elemental mercury with halogen from the additive; adsorbing the oxidized mercury generated by the combustion of the coal with an adsorbent in the flue gas, and collecting the adsorbent with the oxidized mercury in a combustion waste treatment system.

32 Claims, 4 Drawing Sheets

OTHER PUBLICATIONS

"$NO_x$ Control for Boilers", GE Power Systems, pp. 1-2, printed Dec. 17, 2003.

"Coalogic™", GE Power Systems, pp. 1-2, printed Dec. 17, 2003.

"Coal Balancing & Blending", GE Power Systems, pp. 1-2, printed Dec. 17, 2003.

"$NO_x$ Reduction", Hamon, pp. 1-2, Dec. 8, 2003.

"Selective Catalytic Reduction (SCR)", Hamon, pp. 1-2, printed Dec. 8, 2003.

"Selective Non-Catalytic Reduction (SNCR)", Hamon, pp. 1-3, printed Dec. 8, 2003.

"SCR SNCR Hybrid System", Hamon, pp. 1-2, Dec. 8, 2003.

"Evaluation of the Effect of SCR $NO_x$ Control Technology on Mercury Speciation", Feeley, III et al., Mar. 2003, pp. 1-11.

John H. Pavlish et al., "Status Review Of Mercury Control Options For Coal-Fired Power Plants", pp. 89-165, Fuel Processing Technology 82 (2003).

Thomas D. Brown et al., "Mercury Measurement And Its Control: What We Know, Have Learned, and Need To Further Investigate", Journal of the Air & Waste Management Association, pp. 628-640, vol. 49, Jun. 1999.

Blair A. Folsom et al, "Combustion Modification—An Economic Alternative for Boiler $No_x$ Control", GE Power Systems, GER-4192, pp. 1-8, Apr. 2001.

R. Sehgal et al., "Intelligent Optimization of Coal Burning to Meet Demanding Power Loads, Emission Requirements, and Cost Objectives", GE Power Systems, GER-4198, pp. 1-14, Oct. 2000.

The Washington Post, "Limiting Mercury Pollution Is Focus of Hot Debate", pp. A3, Mar. 15, 2004.

Vosteen Consulting GmbH Letter of Nov. 9, 2006.

Believed to be Vosteen Poster presented at Air Quality (IV) Conference in Arlington, VA in Sep. 2003 (information provided on information and belief).

METHOD FOR REMOVAL OF MERCURY EMISSIONS FROM COAL COMBUSTION

BACKGROUND OF THE INVENTION

This invention relates to the combustion of coal and in particular to the reduction of mercury (Hg) and nitrogen oxides (NOx) in flue gas generated during coal combustion.

Emissions from coal combustion can contain oxides of nitrogen (NOx) and volatile metals such as mercury (Hg). There is a long felt need to reduce Hg and NOx in gaseous emissions from coil-fired boilers and other industrial coal combustion systems.

As mercury volatizes during coal combustion, it enters the flue gas generated by combustion. Some of the volatized mercury can be captured by coal fly ash and removed via a particulate collection system. The volatized mercury that is not captured in the particulate collection system, or by some other control system, passes into the atmosphere with the stack gases from the coil boiler. It is desirable to capture as much of mercury in flue gas before the stack discharge.

Mercury volatizes as elemental mercury ($Hg^0$) during coal combustion. Oxidized mercury ($Hg^{+2}$) is more easily collected by emission control devices than is elemental mercury. Oxidization of mercury is a known technique to capture mercury and remove it from flue gases. As flue gases cool, mercury is partially oxidized by chlorine which is present in coal and released during combustion. It is believed that most oxidized mercury ($Hg^{+2}$) in flue gas is present as mercury chloride ($HgCl_2$). Oxidation of mercury occurs in combustion gas-phase reactions and on the surface of fly ash. It is believed that mercury oxidation on the surface of fly ash is a predominant channel of mercury oxidation.

Oxidized mercury ($HgCl_2$ or $Hg^{+2}$) is water soluble and is easily adsorbed on high carbon fly ash or activated carbon. The oxidized mercury captured by fly ash may be collected with the ash and removed via a particulate collection system. Oxidized mercury is also easily removed by wet scrubbers that are used to control sulfur dioxide ($SO_2$) emissions. Mercury control is generally most effective when the mercury in flue gas is mostly oxidized.

Controlling mercury emissions is complicated because mercury is present in flue gases in several different forms, such as elemental mercury ($Hg^0$) and oxidized mercury ($Hg^{+2}$). Mercury changes forms throughout the combustion process. To effectively control mercury emissions, a control system should take into account the form or speciation of the mercury present in the flue gases at the location of the control system in the flue gas stream. In addition, it would be beneficial if mercury emission controls reduced NOx in stack gases discharged by a power plant.

There is a special need to control mercury emission from boilers firing low-rank coals, such as coal from the Powder River Basin (hereinafter PRB) and lignite coals. These low-rank coals represent a significant portion of the coal energy market, especially in the U.S. These low-rank coals often have low sulfur content, which minimize $SO_2$ emissions. Mercury emissions from the burning of low-rank coals tends not to oxidize because of the low chlorine (Cl) content of the coal and the presence of other constituents in the coal that tend to suppress Hg oxidation. Chlorine assists in the oxidation of mercury in flue gas. The low chlorine levels in low rank coal results in relatively high levels of elemental mercury in the flue gas from low rank coal. There is a long felt need to reduce the levels of elemental mercury in flue gas in coal fired plants, especially when low-rank coals are fired.

BRIEF DESCRIPTION OF THE INVENTION

The invention may be embodied as a method to reduce emissions in flue gas due to combustion of coal in a combustion unit including the steps of: combusting coal in a primary combustion zone of the combustion unit; releasing elemental mercury from the combustion into the flue gas; injecting $NH_4Cl$, $NH_4Br$, or $NH_4I$ into the flue gas; oxidizing the elemental mercury with a halogen (chlorine, bromine, or iodine) from the injected additive; adsorbing the oxidized mercury generated by the combustion of the coal with an adsorbent in the flue gas, and collecting the adsorbent with the oxidized mercury in a combustion waste treatment system.

The invention may also be embodied as a method to reduce mercury in gas emissions from the combustion of coal in a combustion system, said method comprising: combusting the coal in a primary combustion zone of the combustion system, wherein elemental mercury ($Hg^0$) is released in the flue gas produced by the combustion; staging combustion air supplied to the combustion system by adding a portion of the combustion air to the primary combustion zone and a second portion of the combustion air to an overfire air zone downstream of the combustion zone; maintaining a stoichiometric ratio in the primary combustion zone of no greater than 1.1 so as to form active carbon in the fly ash generated by the combustion of coal; oxidizing the elemental mercury by injection of $NH_4Cl$, $NH_4Br$ or $NH_4I$ in the flue gas to generate oxidized mercury ($Hg^{+2}$); adsorbing the oxidized mercury in the flue gas by the active carbon in the fly ash, and collecting the fly ash with adsorbed mercury in a combustion waste treatment system.

The invention may be further embodied as a system to treat mercury in flue gas emissions from a coal fired furnace comprising: a primary combustion zone receiving combustion air and having a downstream passage for flue gases and fly ash generated during combustion; a coal injector adapted to inject coal into the primary combustion zone; an air injector adapted to introduce combustion oxygen into the combustion zone, wherein an stoichiometric ratio in the zone is no greater than 1.1 so as to form active carbon in the fly ash generated by the combustion of coal; an overfire air burnout zone downstream of the combustion zone and included in the downstream passage, wherein combustion air is injected into the burnout zone; an $NH_4Cl$, $NH_4Br$ or $NH_4I$ injector downstream of the primary combustion zone; a combustion treatment waste system coupled to the flue gas output and a discharge for captured particulate waste, and wherein said primary combustion zone burns the coal, and elemental mercury released in the flue gas reacts with injected additive to oxidize the mercury.

DETAILED DESCRIPTION OF THE INVENTION

Available mercury control technologies for coal-fired power plants tend to be more effective at removing oxidized mercury from flue gas than in removing elemental mercury. A technique has been developed to increase the fraction of oxidized mercury in flue gas by injecting an oxidizing a halogen additive, e.g., ammonium chloride ($NH_4Cl$), $NH_4Br$ or $NH_4I$, into the flue gas. By increasing the fraction of oxidized mercury, the halogen additive increases the amount of mercury removal by activated carbon injection, wet scrubbers and other mercury control technologies. Simultaneously, the halogen additive injection decreases NOx emissions by reducing oxides of nitrogen to molecular nitrogen.

The presence of chlorine containing compounds in flue gas is an important factor in the oxidation of mercury. Chlorine is a halogen that oxidizes mercury. Low rank coals tend to have low chlorine content, e.g., less than 100 ppm, and a high content of alkali metals. These alkali metals tend to react with and remove the chlorine in the low-rank coal flue gas. Mercury oxidation is suppressed during combustion of low rank coals because of the lack of chlorine in the flue gas. Adding chlorine to flue gas of low rank coal should assist in the oxidation of elemental mercury.

Other halogens including bromine (Br) and iodine (I) oxidize mercury to form $HgBr_2$ and $HgI_2$, respectively. Because of very low bromine and iodine contents in coal, these halogens typically contribute very little if any to mercury oxidation in flue gas. However, adding bromine or iodine to flue gas of low rank coals should improve mercury oxidation.

It has been discovered that mercury removal can be significantly improved by injecting ammonium chloride ($NH_4Cl$), $NH_4Br$ or $NH_4I$ into flue gas, especially in the flue gas from low-rank coals. The hot flue gas causes the additive to thermally decompose to form HCl, HBr or HI which results in more significant mercury oxidation. The increase in mercury oxidation allows for improved efficiency of mercury removal by activated carbon (AC) injection, wet flue gas desulfurization (FGD) systems, and other mercury control technologies.

The injected additive also reduces NOx emissions in a selective catalytic reduction (SCR) and/or (SNCR) process, especially if the additive is injected with a nitrogen agent (N-agent) into NOx and $O_2$ containing flue gas at flue gas temperatures in a range of 1600° F. (Fahrenheit) to 2300° F. Injection of additive can also oxidize elemental mercury and improve the performance of the SCR process especially if the additive is injected with N-agent before the SCR unit.

Figure 1:
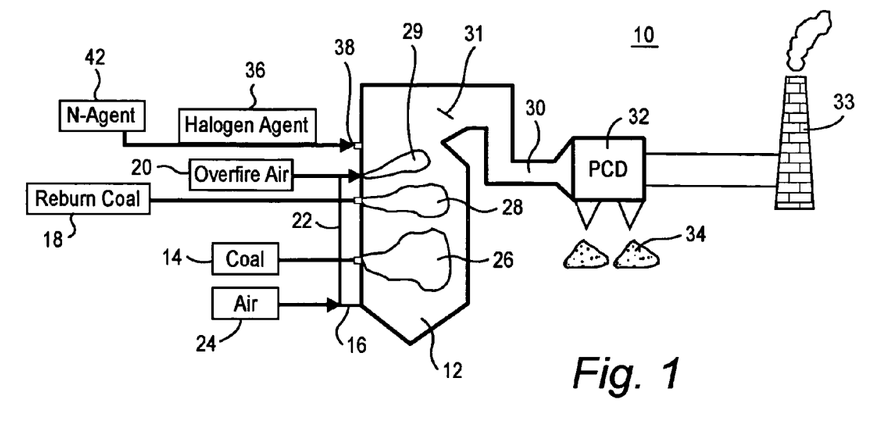
FIG. 1 is a schematic diagram of a coal fired power plant having a primary combustion zone with an additive injection system downstream of the primary combustion zone.

FIG. 1 shows a coal-fired power plant 10 comprising a coal combustion furnace 12, e.g., a boiler, having a coal fuel injection system 14, primary air injectors 16, reburn coal injectors 18 and overfire air (OFA) injectors 20. An exterior air duct 22 may distribute air provided by an air source 24, e.g., ambient air, to the primary combustion air injectors 16 and overfire air injectors 20. The coal injection system 14 and combustion air injectors 16 may be included in a low NOx burner (LNB) system.

The hot gas path through the furnace 12 includes a primary combustion zone 26, a reburn zone 28, an overfire air zone 29, and a convective pass 30. The power plant 10 further includes a particulate control device (PCD) 32 and a fly ash collection unit 34. Most of the coal is burned in a primary combustion zone 26 of the boiler 12. The remaining coal (or fuel) is injected downstream into the reburn zone 28 through the reburn injectors 18 to provide fuel-rich combustion in the reburn zone 28. Overfire air (OFA) is injected into the OFA burnout zone 29 to complete combustion. The hot flue gases flow through the post-combustion zone 31 of the boiler and to a conductive pass 30. Gas emissions are ultimately discharged through a smoke stack 33.

A halogen additive, e.g., ammonium chloride ($NH_4Cl$), $NH_4Br$ or $NH_4I$, is injected as an aqueous solution 36 by nozzles 38 into the flue gas. The halogen assists in the oxidation of elemental mercury in the flue gas. The injection is made downstream from the primary combustion zone 26 at flue gas temperatures of, for example, 1600° F. to 2300° F. The halogen additive can be co-injected with air, recycled flue gas, nitrogen or another carrier gas to increase the penetration of the additive aqueous solution across the flue gas path and to improve mixing of the additive aqueous solution and flue gas. Optionally, the halogen additive can be added to ammonia, urea or other N-agent solution 42 (in a SNCR process) to increase the efficiency of NOx reduction. A SNCR process is a selective non-catalytic reduction process in which ammonia, urea or another N-agent solution is injected into flue gas to reduce NOx emissions.

Figure 2:
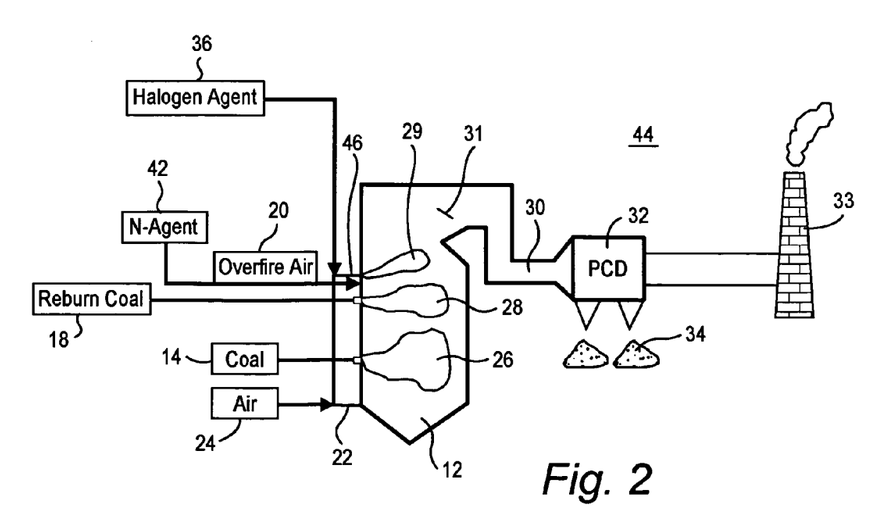
FIG. 2 is a schematic diagram of coal fired power plant similar to the plant shown in FIG. 1 wherein the additive injection is performed in cooperation with an overfire air (OFA) system.

FIG. 2 schematically shows a second coal fired power plant 44. Common reference numbers are used to identify components of the second plant that are common to the first plant 10. In the second plant 44, a halogen containing additive agent, an $NH_4Cl$ aqueous solution 36 is injected through nozzles 46 into the boiler along with the OFA 20 into the burnout zone 29. As with the first plant, the boiler 12 of the second plant 44 can be retrofitted with OFA 20 and/or a reburn system 18. The additive can be injected separately downstream of the primary combustion zone, such as with or downstream of the OFA unit. The halogen additive can also be added with ammonia, urea or other N-agent solution 42 (SNCR process) to increase efficiency of NOx reduction.

Figure 3:
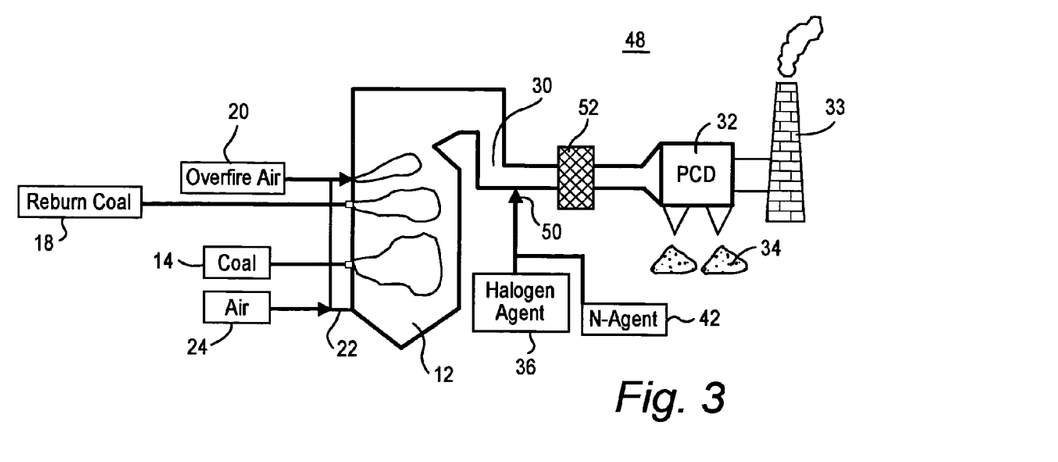
FIG. 3 is a schematic diagram of coal fired power plant similar to the plant shown in FIG. 1 where the additive injector is in a conductive pass of the plant and the conductive pass also includes a Selective Catalytic Reduction (SCR) unit.

FIG. 3 schematically shows a third coal fired power plant 48. Common reference numbers are used to identify components of the third plant that are common to the first plant 10. In the third plant 48, the halogen containing additive is an aqueous $NH_4Cl$ solution 36 that is injected via nozzles 50 into the conductive pass 30 of the boiler and upstream of a selective catalytic reduction (SCR) unit 52. SCR units are conventionally used to minimize NOx emissions by injecting a nitrogenous reducing agent (hereinafter N-agent), such as ammonia or urea, on the surface of a catalyst exposed to flue gas. An SCR unit is typically positioned in the conductive pass 30 where the flue gas is at a temperature of about 700° F. An SCR can relatively easily achieve 80% NOx reduction. As with the first plant, the boiler 12 of the third plant 48 can be retrofitted with OFA 20 and a reburn system 18. The additive can be added with ammonia, urea or other N-agent solution (SNCR process) to increase efficiency of NOx reduction.

To evaluate the injection of a $NH_4Cl$ (a halogen containing additive) downstream of a primary combustion zone of a boiler, tests were performed in a 1.0 MMBTU/hr Boiler Simulator Facility (hereinafter BSF) to determine effect of $NH_4Cl$ injection on Hg oxidation and NOx removal. The BSF is described in U.S. Pat. No. 6,280,695.

Tests were conducted with and without air staging, e.g., with and without OFA. In tests without air staging, the stoichiometric ratio in the primary combustion zone 26 (SR1) was 1.16 which corresponded to about 3% excess air in the flue gas at the BSF emission discharge. The stoichiometric ratio is defined as the ratio of the $O_2$ to fuel concentrations to the ratio of $O_2$ to the fuel concentration that results in complete consumption of $O_2$ and fuel. Combustion of coal without air staging generated about 880 parts-per-million (ppm) of NOx. In the BSF test, the $NH_4Cl$ was injected as an aqueous solution at a nitrogen stoichiometric ratio (NSR) of 0.6. The nitrogen stoichiometric ratio is defined as the ratio of the $NH_4Cl$ concentration to the NO concentration in the flue gas at the location of $NH_4Cl$ injection.

Figure 4:
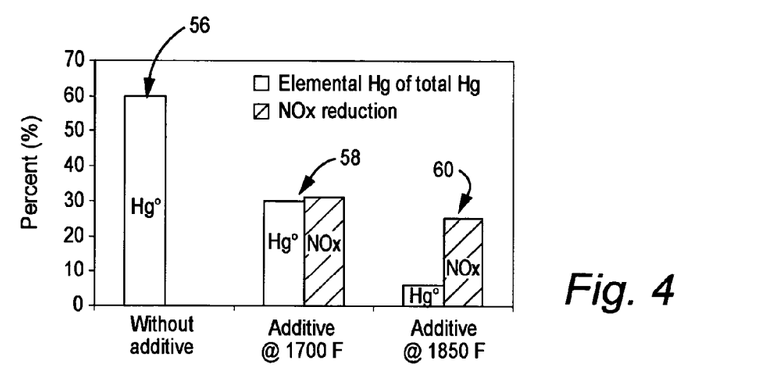
FIG. 4 is a chart of the effects on mercury and $NO_x$ emissions due to the injection of $NH_4Cl$ at different flue gas temperatures.

FIG. 4 is a chart showing the effect of the injection of a $NH_4Cl$ additive on mercury oxidation and on NOx reduction. During the tests reported in FIG. 4, the BSF plant had no air staging. The test results shown in FIG. 4 are for: no $NH_4Cl$ additive (56), an $NH_4Cl$ additive added at a flue gas temperature of 1700° F. (58), and the $NH_4Cl$ additive added to flue gas at 1850° F. (60). FIG. 4 shows the percentage of elemental mercury of the total mercury in the flue gas, and the percentage reduction in NOx due to the $NH_4Cl$ injection. Without $NH_4Cl$ injection, the concentration of elemental mercury in flue gas was about 60% of total mercury. No $NO_x$ reduction was observed without $NH_4Cl$ injection. Injection of the $NH_4Cl$ additive at a flue gas temperature of 1700° F. resulted in about a 30% NOx reduction and a decrease in the concentration of elemental mercury ($Hg^0$) from 60% to about 30% of total mercury indicating that the additive oxidized some mercury. Injection of the $NH_4Cl$ additive at 1850° F. resulted in more significant mercury oxidation while NOx reduction slightly decreased.

Figure 5:
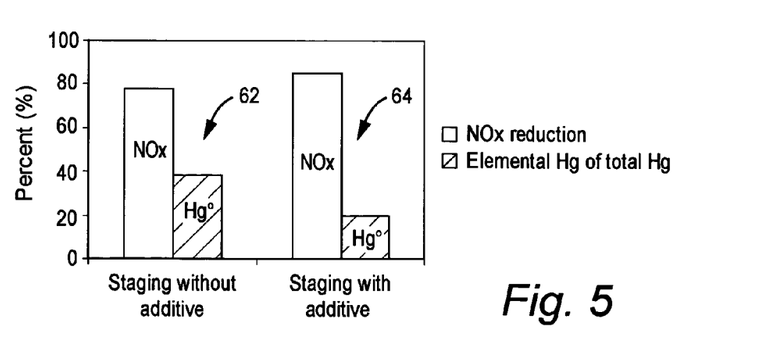
FIG. 5 is a chart of the effects on NOx and Hg emissions due to air staging and $NH_4Cl$ injection.

FIG. 5 is a chart showing test conducted while BSF plant operated with air staging. In these tests, the $SR_1$ was 0.7, and SR2 was 1.16. $SR_1$ is the stoichiometric ratio in the primary combustion zone. SR2 is the stoichiometric ratio at the overfire air injection zone. Overfire air was injected at a flue gas temperature of 2200° F. $NH_4Cl$ was injected as an aqueous solution where the flue gas temperature was at 1800° F. The amount of chlorine in the flue gas provided by $NH_4Cl$ was 120 ppm, and the NSR was 1.5. FIG. 5 shows the effect of the $NH_4Cl$ additive injection on NOx reduction and the reduction of the concentration of the elemental mercury. The test results 62,64 presented in FIG. 5 demonstrate that staging reduces NOx emissions by about 80% in comparison to no staging of combustion air. Injection of the $NH_4Cl$ additive 64 in conjunction with staging increased the efficiency of NOx reduction by an additional 7% (as compared to no NH4Cl—62) and decreased the percentage of elemental mercury ($Hg^0$) of the total mercury in flue gas from about 40% to about 20%. The BSF test results show in FIGS. 4 and 5 demonstrate that the injection of $NH_4Cl$ at flue gas temperatures of 1700° F. to 1850° F. reduces NOx emissions and decreases the concentration of elemental mercury in flue gas.

A computer simulation process model was developed to predict the effect of $NH_4Cl$ on NOx reduction and Hg oxidation. This process model is described in U.S. Pat. No. 6,280, 695.

Figure 6:
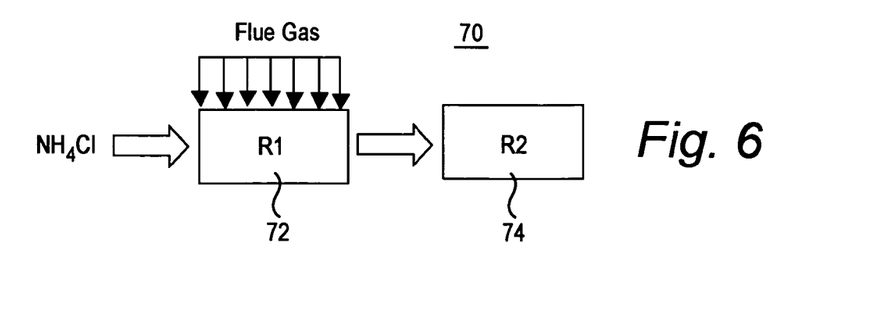
FIG. 6 is a schematic diagram of a computer model for predicting flue gas reactions due to the injection of $NH_4Cl$.

FIG. 6 illustrates a computer model used to describe the mixing of reagents with flue gas to the stream of $NH_4Cl$ (so-called inverse mixing). The model treated the injection of gases introduced to the reaction over a certain period of time (mixing time) rather than instantaneously. FIG. 6 schematically shows a process model 70 that treats the reacting system as a series of two plug-flow reactors R1 (72) and R2 (74). Each reactor describes one of the physical and chemical processes occurring in a boiler: addition of $NH_4Cl$, NOx reduction by N-agent, and mercury oxidation by chlorine compounds. The first reactor R1 describes mixing of flue gas and $NH_4Cl$ using the model of inverse mixing. The mixture entering R1 consisted of $NH_4Cl$. The flue gas was added to $NH_4Cl$ at a constant rate over period of 120 ms. The flue gas added to R1 corresponds to products coming out of the OFA zone in a typical boiler with OFA. The second reactor R2 describes reactions in the burnout zone.

The mixing time and temperature profile in the mixing region R1 of the model were estimated using a single jet in a cross flow model. The mixing time was determined by evaluating the entrainment rate of fluid from the crossflow into the jet. For the $NH_4Cl$ jet, the mixing time was estimated to be 110 ms (milli-second) to 120 ms. Variation of mixing time within the range of 120 ms±20 ms showed little effect on modeling results. A mixing time of 120 ms was used for $NH_4Cl$ injection in the modeling results shown in FIGS. 7 and 8.

The initial amount of NO in the modeled flue gas was 500 ppm. The concentration of $NH_4Cl$ in flue gas after injection was 500 ppm, which corresponded to an NSR of 1.0. The temperature of the flue gas decreased at a linear rate of 550 degrees Fahrenheit per second (F/s). Variations in the temperature gradient within ±50° F. showed little effect on modeling predictions.

Figure 7:
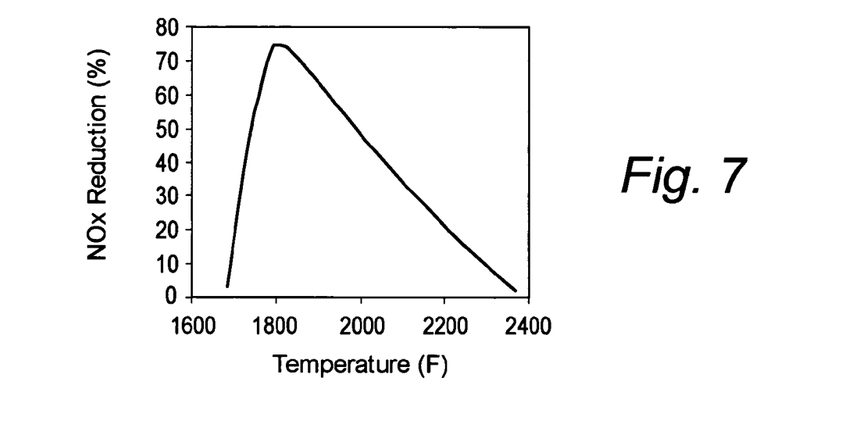
FIG. 7 is a chart of predicted NOx reduction due to $NH_4Cl$ injection.

FIG. 7 is a chart of the results of modeling that show the predicted temperature effect of $NH_4Cl$ injection on NOx reduction. FIG. 7 shows that $NH_4Cl$ injection in a temperature range of 1600° F. to 2300° F. reduces NOx emissions. An optimal range according to the modeling for NOx reduction is 1750° F. to 1950° F. The maximum predicted NOx reduction is about 73% where NSR is 1.0.

Figure 8:
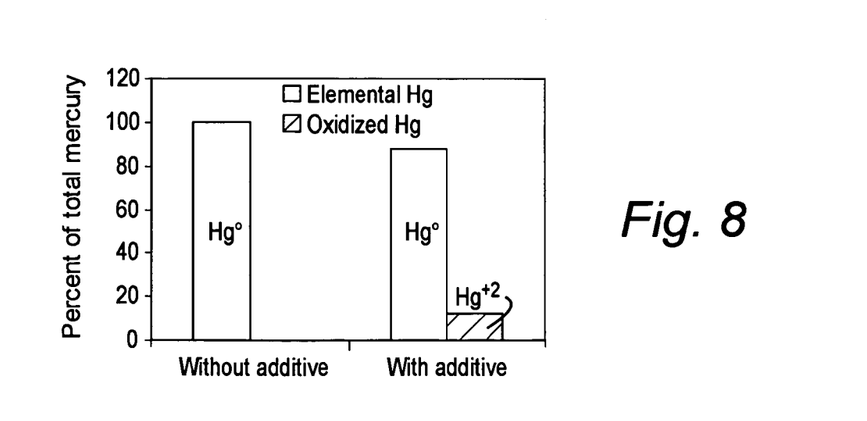
FIG. 8 is a chart of the predicted effects of $NH_4Cl$ injection on elemental an oxidized mercury in flue gas.

FIG. 8 shows a predicted effect of $NH_4Cl$ injection on mercury in flue gas. The $NH_4Cl$ shows the predicted effect of injecting a spray of 500 ppm $NH_4Cl$ in flue gas on mercury speciation. Total mercury concentration of mercury in the flue gas was 10 ppbv. It was assumed that all mercury was present in elemental form ($Hg^0$) prior to $NH_4Cl$ injection. Modeling predicted that about 12% of the $Hg^0$ was oxidized by chlorine compounds in the gas phase due to $NH_4Cl$ injection. Mercury oxidation during coal combustion can be catalyzed by minerals present in fly ash. Mechanism of that heterogeneous process is not well understood and was not considered in modeling. Accordingly, the amount of mercury oxidized in the flue gas may be substantially higher than that predicted by the model.

An equilibrium model was used to predict the effects of chlorine and bromine on mercury oxidation. Equilibrium modeling predicts the most stable composition of products at a specified temperature and pressure, thus indicating the dominant direction for the transformation of mercury-containing species.

Figure 9:
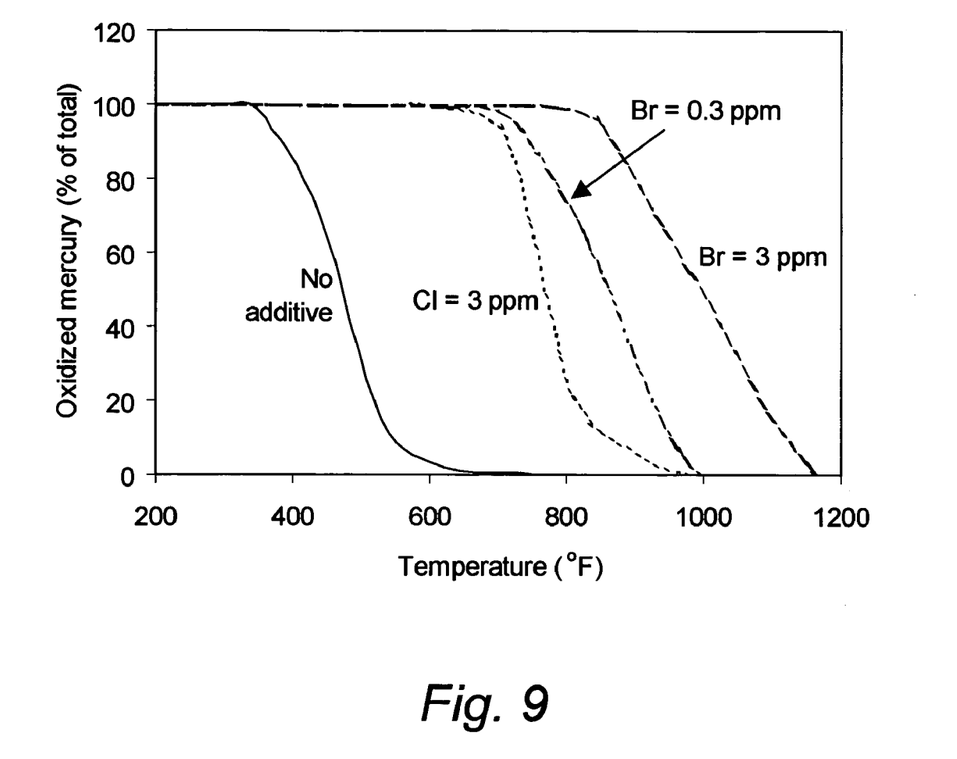
FIG. 9 is a chart of the predicted effect of chlorine and bromine containing species on mercury oxidation.

FIG. 9 shows a predicted effect of chlorine and bromine on concentration of oxidized mercury in flue gas resulting from combustion of a typical PRB coal. The concentration of oxidized mercury is shown as a percent of the total mercury in flue gas. Equilibrium modeling predicted that without additives all mercury is present in the elemental form at temperature higher than 700° F. As temperature decreases, mercury is oxidized by chlorine or bromine released from coal into flue gas during coal combustion.

Modeling predicts that injection of chlorine or bromine in the amount of 3 ppm results in mercury oxidation at higher temperatures. Modeling also predicts that bromine is a more effective oxidizing agent than is chlorine. The model predicted that a presence of only 0.3 ppm of bromine in flue gas results almost in the same effect as 3 ppm of chlorine.

The equilibrium calculations predict that chlorine and bromine containing compounds are mercury oxidizing agents. Modeling also predicts that bromine containing compounds are stronger oxidizing agents than are chlorine containing compounds. It is believed that iodine containing compounds also should be strong mercury oxidizing additives.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to reduce emissions in flue gas due to combustion of coal in a combustion unit, said method comprising:
   a. combusting coal in a primary combustion zone of the combustion unit;
   b. releasing elemental mercury from the combustion into the flue gas;
   c. injecting a halogen-containing additive into the flue gas, wherein the halogen-containing additive is selected from a group consisting of $NH_4Br$ and $NH_4I$;
   d. oxidizing the elemental mercury with a halogen from the halogen-containing additive;
   e. adsorbing the oxidized mercury generated by the combustion of the coal with an adsorbent in the flue gas, and
   f. collecting the adsorbent with the mercury in a combustion waste treatment system.

2. A method as in claim 1 wherein the coal comprises a coal having a low chlorine content.

3. A method as in claim 2 wherein the coal having the low chlorine content is a Powder River Basin coal or lignite coal.

4. A method as in claim 2 wherein the coal having the low chlorine content has less than 100 parts-per-million (ppm) of chlorine.

5. A method as in claim 1 wherein the combustion waste treatment system includes a particle control device.

6. A method as in claim 1 wherein the adsorbent is fly ash, and the oxidized mercury is adsorbed on the fly ash.

7. A method as in claim 1 wherein the adsorbent is activated carbon, and the oxidized mercury is adsorbed on the activated carbon.

8. A method as in claim 1 further comprising heating the halogen-containing additive with flue gas to generate HBr or HI and oxidizing the elemental mercury with the HBr or HI.

9. A method as in claim 1 further comprising injecting overfire air downstream of the primary combustion zone to generate excessive carbon fly ash and the adsorbent is the fly ash.

10. A method as in claim 9 wherein the stoichiometric ratio (SR1) in the primary combustion zone is less than 1.1, and the stoichiometric ratio (SR2) at an overfire air injection zone is above 1.0.

11. A method as in claim 10 wherein SRi is no greater than 0.8 and SR2 is no less than 1.16.

12. A method as in claim 1 further comprising coal reburning downstream of the primary combustion zone to form carbon in fly ash generated during combustion, and the fly ash is the adsorbent.

13. A method as in claim 1 further comprising injecting a nitrogenous reducing agent into the flue gas.

14. A method as in claim 13 further comprising a catalytic surface for NOx and mercury oxidation.

15. A method as in claim 1 wherein the halogen containing additive is injected where the flue gas is in a temperature range of 1600° F. to 2300° F.

16. A method as in claim 1 wherein the halogen containing additive is injected where the flue gas is in a temperature range of 1750° F. to 1950° F.

17. A method as in claim 1 wherein an amount of halogen injected into the flue gas by the halogen containing additive is in the range of 1 to 200 parts per million.

18. A method as in claim 1 wherein the halogen containing additive is injected in an aqueous solution into the flue gas.

19. A method as in claim 18 wherein the halogen containing additive is injected in the solution further comprises $NH_4OH$.

20. A method as in claim 18 wherein the halogen containing additive is injected in the solution further comprises urea.

21. A method as in claim 1 wherein the mercury released from combustion is mostly elemental mercury ($Hg^0$) and further comprising oxidizing the elemental mercury as the flue gases cools.

22. A method as in claim 21 wherein the oxidized mercury is removed from flue gas in a scrubber.

23. A method as in claim 1 further comprising injecting an aqueous solution of the halogen containing additive with a carrier gas.

24. A method as in claim 23 wherein the carrier gas is at least one of air, recycled flue gas and nitrogen gas.

25. A method to reduce mercury in gas emissions from the combustion of coal in a combustion system, said method comprising:
   a. combusting the coal in a primary combustion zone of the combustion system, wherein elemental mercury ($Hg^0$) is released in the flue gas produced by the combustion;
   b. staging combustion air supplied to the combustion system by adding a portion of the combustion air to the primary combustion zone and a second portion of the combustion air to an overfire air zone downstream of the combustion zone;
   c. maintaining stoichiometric ratio in the primary combustion zone of no greater than 1.1 so as to form active carbon in the fly ash generated by the combustion of coal;
   d. oxidizing the elemental mercury by injection of a halogen containing additive in the flue gas to generate oxidized mercury ($Hg^{+2}$), wherein the halogen-containing additive is selected from a group consisting of $NH_4Br$ and $NH_4I$;
   e. adsorbing the oxidized mercury in the flue gas by the active carbon in the fly ash, and
   f. collecting the fly ash with adsorbed mercury in a combustion waste treatment system.

26. A method as in claim 25 wherein the combustion waste treatment system comprises a particle control device capturing the fly ash with adsorbed mercury and discharging the captured fly ash to a fly ash collection unit.

27. A method as in claim 25 wherein the combustion waste treatment system comprises a particle control device capturing the fly ash after the fly ash cools to a temperature no greater than 400 degrees Fahrenheit.

28. A method as in claim 25 further comprising coal reburning in the combustion system to form carbon in the fly ash generated during combustion.

29. A method as in claim 28 wherein an amount of reburning fuel used during the coal reburning is in a range of about 10 to about 30 percent of a total heat input of fuel used for the combustion.

30. A method as in claim 28 wherein an amount of reburning fuel used during the coal reburning is in a range of about 15 to about 25 percent of a total heat input of fuel used for the combustion.

31. A method as in claim 25 wherein combustion occurs in a low nitrogen oxide (NOx) burner.

32. A method to reduce emissions in flue gas due to combustion of coal in a combustion unit, said method comprising:
   a. combusting coal in a primary combustion zone of the combustion unit;
   b. releasing elemental mercury from the combustion into the flue gas;
   c. injecting a halogen-containing additive into the flue gas, wherein the halogen-containing additive includes $NH_4I$;
   d. oxidizing the elemental mercury with a halogen from the halogen-containing additive;
   e. adsorbing the oxidized mercury generated by the combustion of the coal with an adsorbent in the flue gas, and
   f. collecting the adsorbent with the mercury in a combustion waste treatment system.

* * * * *